United States Patent
Jarok et al.

(10) Patent No.: US 10,579,706 B2
(45) Date of Patent: Mar. 3, 2020

(54) APPLYING PROBABILITY FUNCTIONS IN REAL-TIME

(71) Applicant: Goodrich Corporation, Charlotte, NC (US)

(72) Inventors: Jonathan C. Jarok, Chelmsford, MA (US); Scott W. Ramsey, Northbridge, MA (US)

(73) Assignee: Goodrich Corporation, Charlotte, NC (US)

( * ) Notice: Subject to any disclaimer, the term of this patent is extended or adjusted under 35 U.S.C. 154(b) by 51 days.

(21) Appl. No.: 15/863,718

(22) Filed: Jan. 5, 2018

(65) Prior Publication Data

US 2019/0213236 A1    Jul. 11, 2019

(51) Int. Cl.
| | |
|---|---|
| *G06F 17/18* | (2006.01) |
| *G01S 7/486* | (2006.01) |
| *G01S 17/42* | (2006.01) |
| *G01S 7/48* | (2006.01) |
| *G01S 17/10* | (2006.01) |
| *G01S 7/487* | (2006.01) |
| *G06F 5/01* | (2006.01) |
| *G01S 17/89* | (2006.01) |
| *G01S 7/4861* | (2020.01) |
| *G01S 7/4865* | (2020.01) |

(52) U.S. Cl.
CPC ............ *G06F 17/18* (2013.01); *G01S 7/4808* (2013.01); *G01S 7/4861* (2013.01); *G01S 7/4865* (2013.01); *G01S 7/4876* (2013.01); *G01S 17/10* (2013.01); *G01S 17/42* (2013.01); *G06F 5/01* (2013.01); *G01S 17/89* (2013.01)

(58) Field of Classification Search
None
See application file for complete search history.

(56) References Cited

U.S. PATENT DOCUMENTS

| | | | |
|---|---|---|---|
| 5,963,653 A | 10/1999 | McNary et al. | |
| 6,104,968 A * | 8/2000 | Ananth | G06F 7/602 |
| | | | 323/283 |
| 6,526,427 B1 * | 2/2003 | Chiskis | G06F 7/724 |
| | | | 708/250 |
| 8,275,193 B2 | 9/2012 | Lin | |
| 2004/0205095 A1 * | 10/2004 | Gressel | G06F 7/582 |
| | | | 708/253 |

OTHER PUBLICATIONS

Extended European Search Report for European Patent Application No. EP18248239.8, dated Jun. 12, 2019.

(Continued)

*Primary Examiner* — Michael D. Yaary
(74) *Attorney, Agent, or Firm* — Locke Lord LLP; Scott D. Wofsy; Judy R. Naamat (57) ABSTRACT

A method for applying probability functions in real time includes receiving an input value. An optimized binary sequence is selected from a lookup table based on the received input value. The lookup table includes probability values of at least a part of a noise probability sequence. The input value is masked by a least significant bit of the selected optimized binary sequence to yield an output value. The selected optimized binary sequence is right shifted by one bit and the right shifted bit is carried over to a most significant bit position of the selected optimized binary sequence.

19 Claims, 5 Drawing Sheets

(56) References Cited

OTHER PUBLICATIONS

Zijing, Zhang, et al: "A Real-time Noise Filtering Strategy for Photon Counting 3D Imaging Lidar", Optics Express, vol. 21, No. 8, Apr. 8, 2013 (Apr. 8, 2013), p. 9247, XP055589697, DOI: 10.1364/0E.21.009247.
Zijing, Zhang, et al: "Noise Filtering Strategy in Photon-Counting Laser Radar Using the Multi-Gates Detection Method", OPTIK, Wissenschaftliche Verlag GmbH, DE, vol. 127, No. 20, Jun. 29, 2016 (Jun. 29, 2016), pp. 8926-8932, XP029779758, ISSN: 0030-4026, DOI: 10.1016/JAJLE0.2016.06.099.
Magruder, Lori a., et al: "Noise Filtering Techniques for Photon-Counting Ladar Data", Laser Radar Technology and Applications Xvii, SPIE, 1000 20th St., Bellingham WA 98225-6705 USA, vol. 8379, No. 1, May 11, 2012 (May 11, 2012), pp. 1-9, XP060003258, DOI: 10.1117/12.919139.

\* cited by examiner

(12) United States Patent

APPLYING PROBABILITY FUNCTIONS IN REAL-TIME

FIELD OF THE INVENTION

Embodiments of the present invention relate generally to Geiger mode based Light Detection And Ranging (LiDAR) systems, and specifically to applying probability functions in real-time.

BACKGROUND OF THE INVENTION

Conventional LiDAR systems are used to determine distances from objects using time-of-flight of light generated by a laser. LiDAR systems may be used in fixed locations or on moving objects to capture data about those objects and/or a surrounding area.

Some LiDAR systems may employ a Geiger mode detector (e.g., Avalanche Photo-Diodes (APD)), or an array of detectors for detecting light reflected off of an object spaced a distance therefrom. The term "Geiger mode" refers to an application of a bias voltage which exceeds the breakdown voltage of the APD. When the APD is over biased, the detector operates in a metastable state where a single photon may cause an avalanche current. The avalanche current can then be detected using simple digital circuitry. In the case of LiDAR, the detection of an avalanche stops a timing circuit which in turn is used to measure the time of flight of a transmitted laser pulse to the object. The distance to the object can then be determined given the speed of light.

Despite the advantages of Geiger mode detectors, they suffer from certain drawbacks. For example, the Geiger mode arrays may comprise continuously triggering detectors ("hot detectors"). While the data from the hot detectors can be discarded during post processing, the hot detectors require a lot of processing power to filter the signal from the noise in real-time. Thus, it is desirable to provide an improved three-dimensional imaging system which employs LiDAR with an improved signal-to-noise ratio. Further, it is desirable to provide a LiDAR system capable of performing noise data filtering in real-time.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for applying probability functions in real time includes receiving an input value. An optimized binary sequence is selected from a lookup table based on the received input value. The lookup table includes probability values of at least a part of a noise probability sequence. The input value is masked by a least significant bit of the selected optimized binary sequence to yield an output value. The selected optimized binary sequence is right shifted by one bit and the right shifted bit is carried over to a most significant bit position of the selected optimized binary sequence.

In another aspect, a system for applying probability functions in real time includes a lookup table configured to store probability values of at least a part of a noise probability sequence. The system further includes a processor operatively coupled to the lookup table. The processor is configured to receive an input value and configured to select an optimized binary sequence from the lookup table based on the received input value. The processor includes a logic function configured to mask the input value by a least significant bit of the selected optimized binary sequence to yield an output value. The processor further includes a shift register configured to right shift the selected optimized binary sequence by one bit and configured to carryover the right shifted bit to a most significant bit position of the selected optimized binary sequence.

BRIEF DESCRIPTION OF THE DRAWINGS

The accompanying appendices and/or drawings illustrate various, non-limiting, examples, lave aspects in accordance with the present disclosure.

DETAILED DESCRIPTION OF CERTAIN EMBODIMENTS

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

As noted above, one of the problems that need to be addressed by modern Geiger mode based LiDAR systems is achieving an acceptable signal-to-noise ratio. Such systems include a photon detector configured to detect single photons. A distribution of detected photons observed over time can be modeled as a Poisson distribution. Processing of captured image information can be performed in real-time, and processed scene information can include data frames that comprise three-dimensional and two-dimensional image data. Such processing could include noise filtering. The noise filtering process can be applied to remove noise or other extraneous data from signals. However, computational efforts to subtract systematic spatial and temporal noise from the received image data in real time typically require heavy processing techniques.

Embodiments of the present invention are directed to a simple and efficient method to remove background noise or other extraneous data from LiDAR signal in real-time with minimized effect on system's performance. The disclosed method removes noise by applying a probability function in real-time in a processor using a multiplier and a circular shift register, as discussed below.

Figure 1:
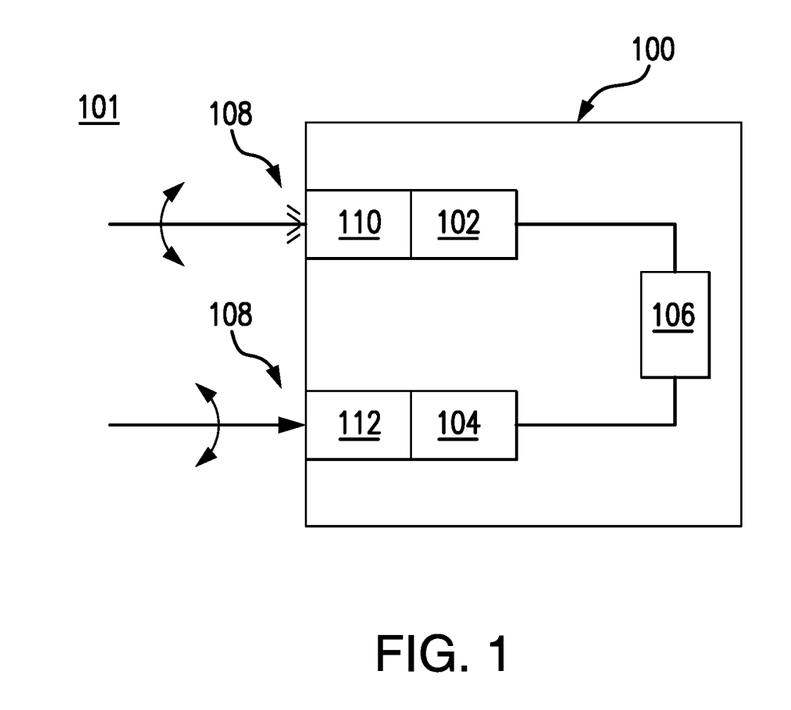
FIG. 1 depicts a schematic drawing of a LiDAR system in accordance with the illustrative embodiment of the present invention.

FIG. 1 depicts a schematic drawing of a LiDAR system in accordance with the illustrative embodiment of the present invention. Imaging system 100 includes a laser pulse emitter 102 and a laser pulse detector 104. A single controller 106, such as single field programmable gate array (FPGA) is connected to the laser pulse emitter 102 and to the laser pulse detector 104 to control timing of a laser pulse 108 emitted from the laser pulse emitter 102 to a scene 101 and corresponding timing of opening the laser pulse detector 104 for detection of a return of the laser pulse 108 returning from the scene. A scanner 110 is optically connected to the laser pulse emitter for scanning laser pulses over a field of regard, schematically indicated by the double arrows in FIG. 1. A scanner 112 is optically connected to the laser pulse detector 104 for detecting laser pulse returns from the field of regard, also indicated by the double arrows in FIG. 1. The system 100 can include machine readable instructions, e.g., stored in controller 106, or stored elsewhere in system 100 and communicated to controller 106, wherein the instructions are configured to cause the controller 106 to perform any of the methods disclosed herein. The laser pulse emitter 102 and the laser pulse detector 104 are not slaved to one another, but are independently controlled by the single controller 106.

The primary sources of noise in the LiDAR signal arise from various sources. Among them are: quantum noise in the photon limited pulse signal, background radiation, microturbulence (mainly water vapor) in the atmosphere, dark current noise in the instrument, thermal noise in the instrument (e.g., Johnson, Nyquist), direct or reflected solar light. The background noise exhibits a known probability function or it can be calculated over time. Typically, the background noise may be highly dependent on either out-of-band-blocking or in-band blocking of the receiving optical filter.

Figure 3:
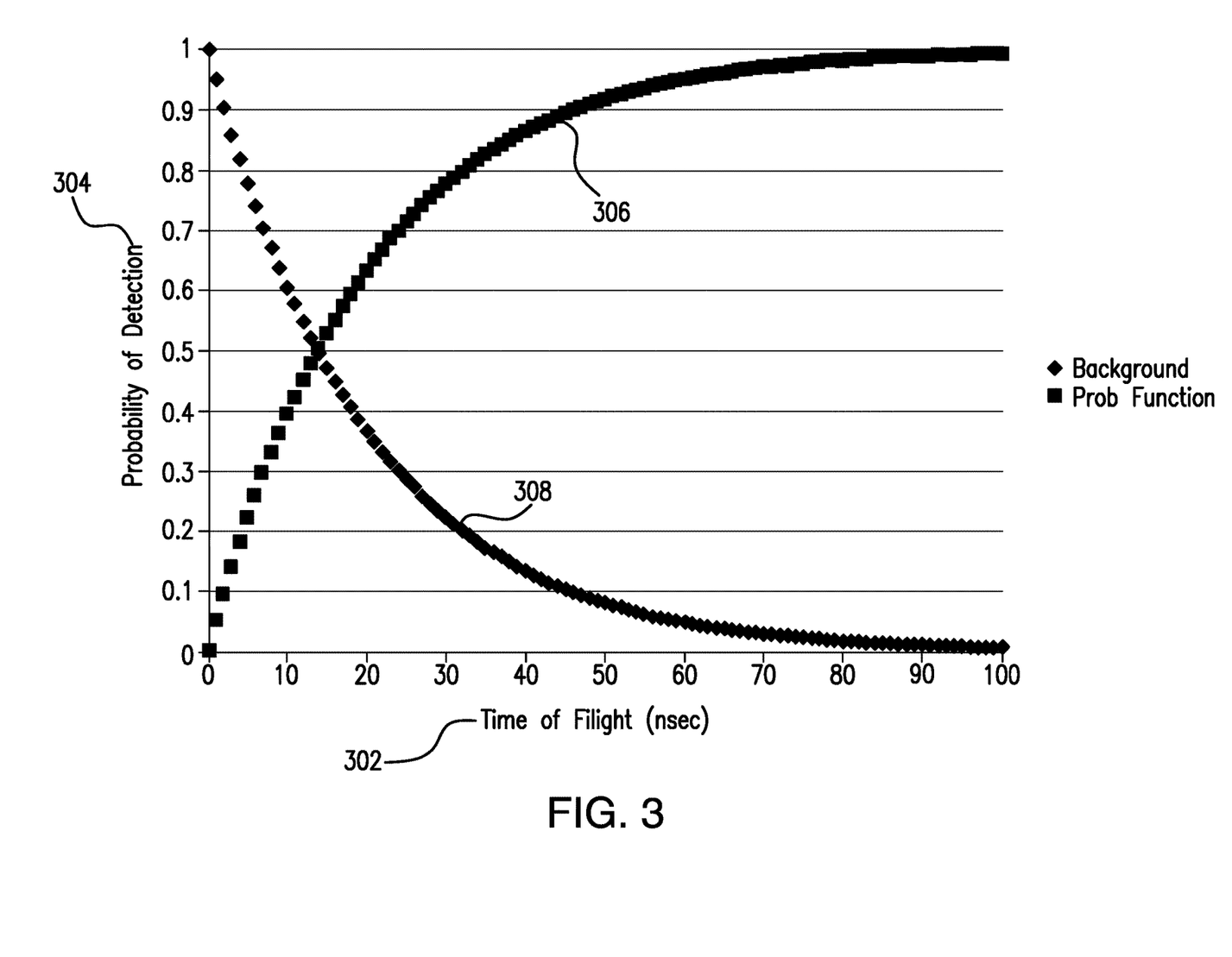
FIG. 3 depicts a plot of probability detection versus time of flight.

FIG. 3 depicts a plot of probability of detection versus time of flight. In FIG. 3, vertical axis 304 represents probability for the detected photons, while horizontal axis 302 represents time of flight of detected photons. Background noise probability function is represented by a first graph 306. This background noise probability function is an inverse of the probability of detection function represented by a second graph 308 in FIG. 3.

Figure 2:
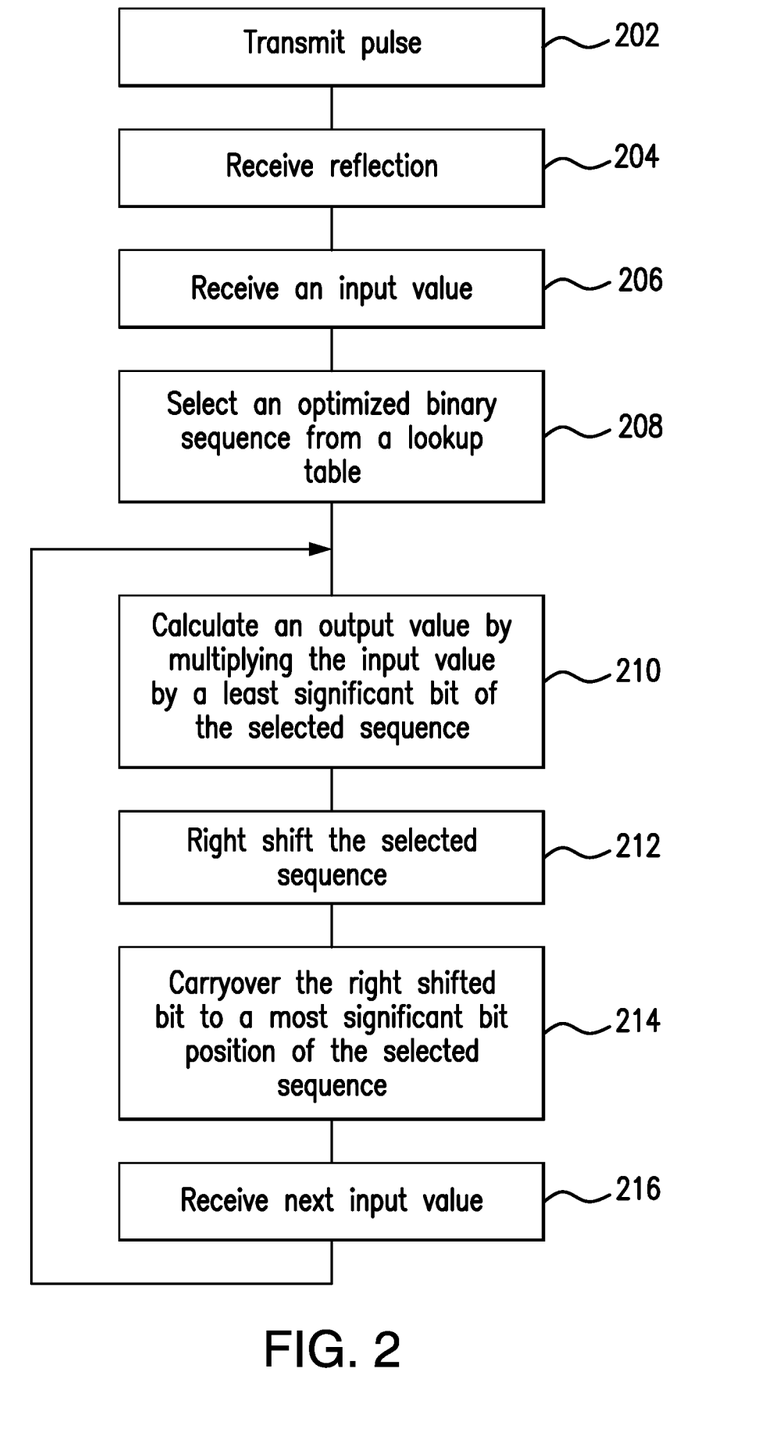
FIG. 2 is a flowchart depicting a method for applying probability function in real time in the LiDAR system of FIG. 1, in accordance with an embodiment of the present invention.

FIG. 2 is a flowchart depicting a method for applying probability function in real time in the LiDAR system of FIG. 1, in accordance with an embodiment of the present invention. The disclosed method begins with step 202, wherein laser pulse emitter 102 transmits a train of pulses.

At step 204, processor 106 enables detector 104 to detect reflection 108. The received LiDAR data points are represented as measurement of time and represent one or more reflected light pulses, where the reflected light pulses are reflected off of one or more objects. The received LiDAR data produces a point cloud. A point cloud is a set of vertices in a multiple-dimensional coordinate system. These vertices are usually defined at least by x, y, and z coordinates, and can be numbered in the billions. Having this much data to work with is a blessing, but also turns out to be a blight that frustrates computational, transmissive, and storage plans for many applications. Furthermore, as noted above, the received LiDAR data points may be "filled" with noise signals.

According to an embodiment of the present invention, processor 106 is configured to filter interference/noise signals. The background noise is represented as a probability of times. Therefore, background noise cannot be subtracted by simply subtracting histograms from the received LiDAR data points. Embodiments of the present invention contemplate suppression/removal of the background noise signals using either the probability distribution function or the inverse probability distribution function of the background noise, shown in FIG. 3.

According to an embodiment of the present invention, processor 106 begins removal of background noise at step 206 by receiving an input value. In various embodiments, the input value may comprise any LiDAR data point.

Figure 4:
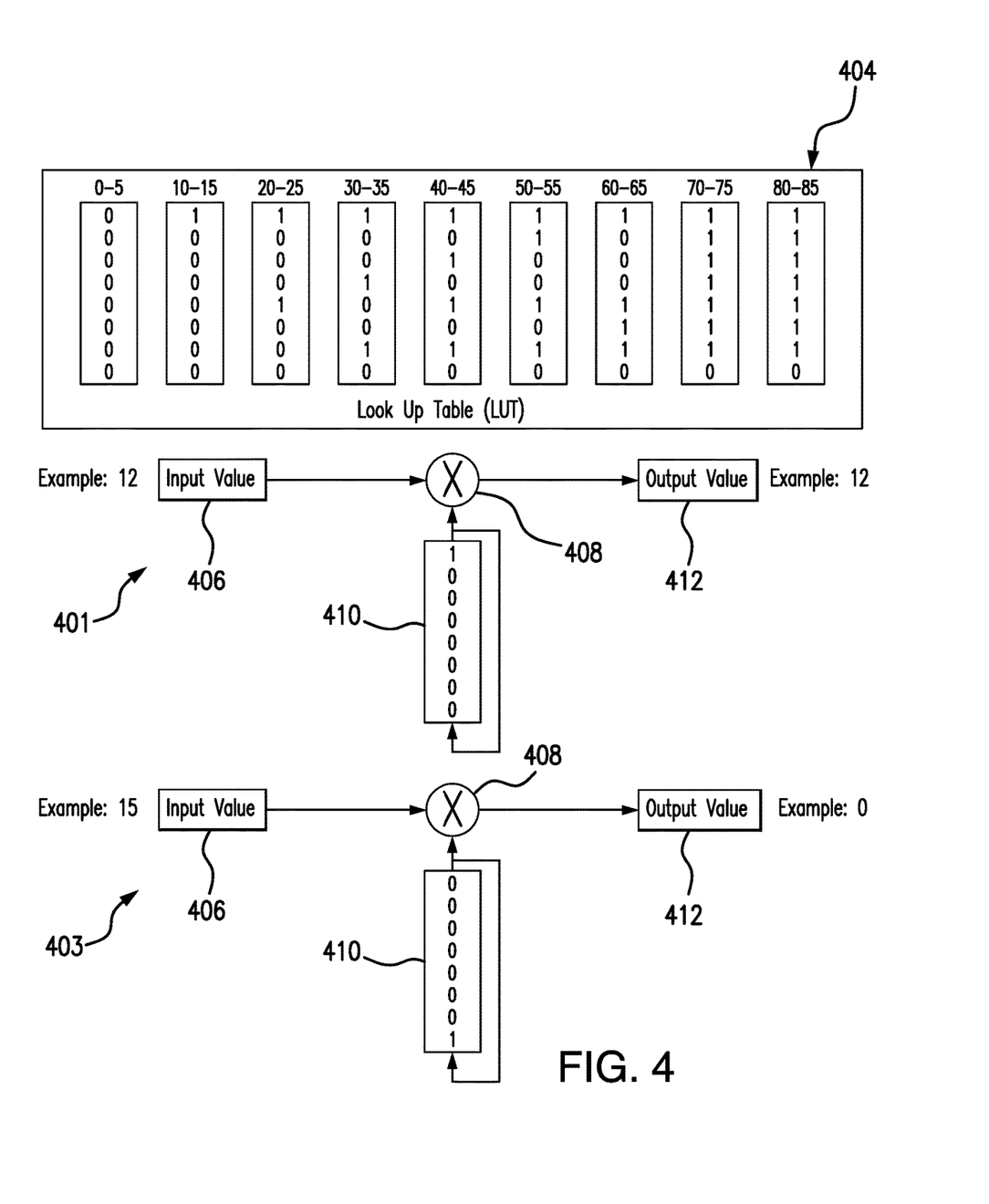
FIG. 4 is a schematic diagram illustrating an example of applying a probability function in real time in the LiDAR system of FIG. 1, in accordance with an embodiment of the present invention.

FIG. 4 is a schematic diagram illustrating an example of applying a probability function in real time in the LiDAR system of FIG. 1, in accordance with an embodiment of the present invention. FIG. 4 illustrates normal distribution 402 of the probability distribution function representing background noise. Lookup table 404 in FIG. 4 contains probability values of at least a part of a noise probability sequence. In one embodiment, the noise probability sequence is derived from a probability density function. In an embodiment, the optimized binary (noise probability) sequence comprises a pattern predefined to minimize the distance between zero values and non-zero values. Since exemplary input value of the first example 401 in FIG. 4 is "12", processor 106 selects "10000000" sequence value from the lookup table 404 and loads it into shift register with carry 410 (step 208).

According to an embodiment of the present invention, at step 210, processor 106 calculates an output value by multiplying (masking) the input value stored in register 406 by a least significant bit of the selected noise probability sequence stored in the shift register 410. This multiplication operation can be performed using an integrated logic function or mask 408. In one embodiment, the logic function 408 comprises a conventional single bit multiplier. In an alternative embodiment, the logic function 408 comprises a conventional comparator. The logic function can be represented as logical AND. In other words, if the function value is 1 then an output value is equal to an input value. Otherwise, the output value is equal to 0.

At step 212, processor 106 shifts right by one bit the selected sequence stored in the shift register 410. According to an embodiment of the present invention, the shifted bit is carried over to a most significant bit position of the selected sequence, as shown in the shift register 410 of the second example 403 shown at the bottom of FIG. 4. The result of the multiplication is stored in register 412. In the first example 401 shown in FIG. 4, the input value is equal to "12" and the least significant bit position of the sequence stored in the shift register 410 is "1". Therefore, the output value is equal to "12" as well. In the second illustrated example 403 the input value is 15 but the least significant bit position of the sequence is "0" now, making the output value 412 equal to "0" as well. The resulting output value can be used or replaced by processor 106. At step 216, processor 106 receives next input value and repeats steps 208-216 to remove the remaining noise from the LiDAR data points.

Figure 5:
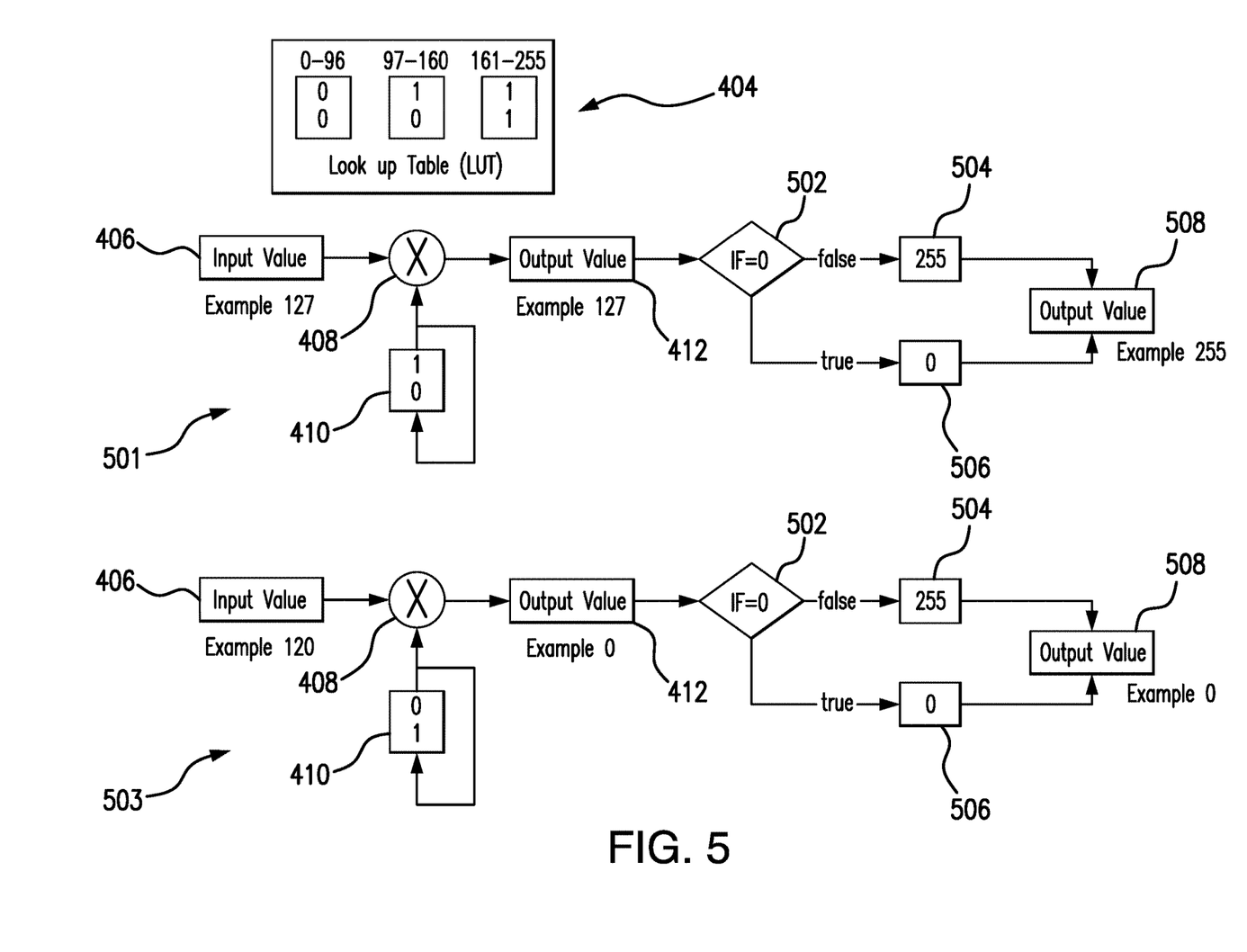
FIG. 5 is a schematic diagram illustrating another example of applying a probability function in real time, in accordance with an embodiment of the present invention.

FIG. 5 is a schematic diagram illustrating another example of applying a probability function in real time, in accordance with an embodiment of the present invention. This example illustrates application of a probability function using binary thresholding technique. For each image, every super-pixel may have a blur measure. A simple segmentation algorithm may use thresholding; content adaptive thresholding selection for example. Thresholding is perhaps the simplest method of image segmentation. From a grayscale image, thresholding can be used to create binary images. Typically, binary thresholding sets any value less than N to color black and sets any value greater than or equal to N to color white. The disclosed technique could also be used in other conventional filtering techniques such as low pass, band pass, high pass, notch and multiple notch filtering.

According to lookup table 404 in FIG. 5 values 0-96 correspond to false, representing, for example, black color ("00" probability sequence), values 161-255 correspond to true, representing, for example, white color ("11" probability sequence) and values 97-160 represent uncertainty numbers ("10" probability sequence). In the first example 501 of FIG. 5, input value "127" corresponds to uncertainty numbers and thus, processor 106 loads "10" sequence into the shift register 410.

Since the least significant bit position of the sequence stored in the shift register 410 is "1", the result of the multiplication operation is "127", which is stored in register 412. Next, processor 106 determines whether the output value stored in register 412 is equal to 0 (step 502). In response to determining that the multiplication result is 0 (decision block 502, "true" branch), processor 106 assigns value of 0 to binary thresholding output, stored in register 508. In response to determining that the multiplication result is not 0 (decision block 502, "false" branch), processor 106 assigns "255" to binary thresholding output. Since in the first example 501 the result of multiplication is equal to "127", processor 106 stores value "255" in the binary thresholding output register 508. It is noted, as described above in conjunction with FIG. 4, processor 106 shifts right by one bit the selected sequence stored in the shift register 410 and the shifted bit is carried over to a most significant bit position of the selected sequence, as shown in the shift register 410 of the second example 503.

The least significant bit position of the sequence stored in the shift register 410 in the second example 503 contains "0" value, so the result of the multiplication operation is also "0", which is stored in register 412. In this case step 502 evaluates to "true". As a result, processor 106 stores "0" in the binary thresholding output register 508.

In an embodiment of the present invention, processor 106 may be implemented as Field Programmable Gate Array (FPGA). Likewise, application-specific integrated circuit (ASICs) may also be utilized in the place of processors 106 where appropriate, and accordingly any implementation disclosed herein inherently includes the disclosure of alternative implementations using ASIC in the place of processor 106. Therefore, anywhere processor 106 is mentioned is understood to also disclose the alternative use of FPGAs/ASICs and the like.

In summary, various embodiments of the present invention are directed to a LiDAR system with an improved SNR that utilizes a fast noise filtering method suitable for real-time data processing. The embodiments improve SNR by subtracting off the likely background noise. The disclosed LiDAR system applies a known noise probability distribution function using low cost hardware components, such as a multiplier and a circular shift register. The disclosed embodiments improve performance of general image processing, such as binary thresholding, low pass, band pass, high pass, notch and multiple notch filtering, segmentation and identification of closed-contour features in images.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages that can be converted to a machine language. The program code may also be written in a Hardware Descriptor Language (HDL). HDLs are frequently used to specify circuit designs for an integrated circuit (IC), such as a field programmable gate array (FPGA), application specific integrated circuit (ASIC), or the like. An electronic design automation (EDA) tool compiles HDL code specifying a circuit design for implementation in a target IC. Example HDLs include Verilog, SystemVerilog, and VHDL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN) or WLAN, or the connection may be made to an external computer (for example, through the Internet using an Internet Service Provider).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for applying probability functions in real time, the method comprising steps of:
   receiving an input value;
   selecting an optimized binary sequence from a lookup table based on the received input value, the lookup table comprising probability values of at least a part of a noise probability sequence;
   masking the input value by a least significant bit of the selected optimized binary sequence to yield an output value; and
   right shifting the selected optimized binary sequence by one bit and carrying over the right shifted bit, as originally shifted, to a most significant bit position of the selected optimized binary sequence.

2. The method of claim 1, wherein the step of masking is performed by a binary multiplier and wherein the step of right shifting is performed by a circular bit shift register.

3. The method of claim 2, wherein the binary multiplier and the circular shift register are components of a Field Programmable Gate Array (FPGA) circuit.

4. The method of claim 2, wherein the binary multiplier and the circular shift register are components of a single Application Specific Integrated Circuit (ASIC).

5. The method of claim 1, wherein the optimized binary sequence is derived from a probability density function.

6. The method of claim 1, wherein the input value comprises real-time image data collected by a sensor of a Geiger mode based light detection and ranging (LiDAR) system.

7. The method of claim 5, wherein the optimized binary sequence comprises a pattern predefined to minimize the distance between zero values and non-zero values.

8. The method of claim 2, wherein the binary multiplier comprises a logic mask.

9. The method of claim 1, further comprising repeating the method with a next input value of a plurality of input values using the most recently shifted selected optimized binary sequence as the selected optimized binary sequence.

10. A system for applying probability functions in real time, the system comprising:
    a lookup table configured to store probability values of at least a part of a noise probability sequence;
    a processor operatively coupled to the lookup table, the processor configured to receive an input value and configured to select an optimized binary sequence from the lookup table based on the received input value;
    the processor comprising:
       a logic function configured to multiply the input value by a least significant bit of the selected optimized binary sequence to yield an output value; and a shift register operatively connected to the logic function, the shift register configured to right shift the selected optimized binary sequence by one bit and configured to carryover the right shifted bit, as originally shifted, to a most significant bit position of the selected optimized binary sequence.

11. The system of claim 10, wherein the shift register comprises a circular bit shift register.

12. The system of claim 10, wherein the processor comprises a Field Programmable Gate Array (FPGA) circuit.

13. The system of claim 10, wherein the processor comprises a single Application Specific Integrated Circuit (ASIC).

14. The system of claim 10, wherein the binary multiplier comprises a single bit multiplier.

15. The system of claim 10, wherein the binary multiplier comprises a comparator.

16. The system of claim 10, wherein the binary multiplier comprises a logic mask.

17. The method of claim 9, wherein the method is used for applying the probability functions during a real time Light Detection and Ranging (LiDAR) process and the plurality of data points are included in one or more point clouds of LiDAR produced data.

18. The system of claim 10, wherein the a processor is further configured to receive a next input value of a plurality of input values, the logic function is further configured to use the most recently shifted selected optimized binary sequence as the selected optimized binary sequence.

19. The system of claim 18, wherein the system is a LiDAR system and the plurality of data points are included in one or more point clouds of LiDAR produced data.

* * * * *